United States Patent [19]
Tabor

[11] 3,858,674
[45] Jan. 7, 1975

[54] ELECTRIC MOTOR-FLYWHEEL DRIVE SYSTEM

[76] Inventor: Harry Zvi Tabor, 13 Hameyasdim St., Jerusalem, Israel

[22] Filed: Oct. 16, 1972

[21] Appl. No.: 297,952

[30] Foreign Application Priority Data
Oct. 21, 1971 Israel................................ 37992

[52] U.S. Cl................. 180/65 R, 310/74, 318/161
[51] Int. Cl............................................ B60k 21/08
[58] Field of Search ........ 180/65 R; 310/74, 78, 83, 310/92–101; 318/139, 161

[56] References Cited
UNITED STATES PATENTS

| | | | |
|---|---|---|---|
| 1,825,934 | 10/1931 | Bing.................................. | 310/100 |
| 2,741,731 | 4/1956 | Pestarini......................... | 318/161 X |
| 2,836,271 | 5/1958 | Jaeschke........................... | 310/96 |
| 3,202,234 | 8/1965 | Osborne........................... | 180/65 R |
| 3,476,201 | 11/1969 | Swaine............................. | 318/161 X |
| 3,497,026 | 2/1970 | Calvert............................ | 318/161 X |
| 3,628,621 | 12/1971 | Lee................................. | 180/65 R |

*Primary Examiner*—Donovan F. Duggan
*Attorney, Agent, or Firm*—Benjamin J. Barish

[57] ABSTRACT

A variable speed electric drive system for load devices of high enertia comprises an electric motor drive, a flywheel continuously coupled to the electric motor drive, and a bi-directional variable torque converter coupled between the flywheel and the load device for varying the ratio of the output speed and torque to the load device with respect to the input speed and torque from the flywheel, the electric motor drive being of variable speed and having a self-regulation which is substantially matched to the speed regulation of the flywheel.

11 Claims, 6 Drawing Figures

ELECTRIC MOTOR-FLYWHEEL DRIVE SYSTEM

BACKGROUND OF THE INVENTION

The present invention relates to electrical motor drive systems, particularly to such drive systems for load devices of high inertia such as vehicles or heavy machinery whose speed must be frequently adjusted. The invention is particularly intended for use with electric road vehicles, and is therefore described below with respect to that particular application.

It is widely appreciated and of great concern that the internal combustion engines presently used in road vehicles are substantial contributors to the air pollution problem, and primarily for this reason considerable effort is being devoted to produce a practical electric motor to replace the internal combustion engines in road vehicles. However, electric road vehicles are in general limited in their range and acceleration performance because of the limitations of electric batteries or fuel cells. For battery operation, the range is severely limited by the energy capacity of the battery; for fuel-cell operation, and also for many batteries, the acceleration is limited because of the limitation of electric current that can be drawn from the battery and because, generally, an electric motor of smaller power rating is used than that of the internal combustion engine used in similar vehicles. In order to keep down the size of the electric motor, it is usually made just large enough to provide the power for cruising at the design speed and there is little reserve power for acceleration or hill-climbing. However, it is well known that high torques can be obtained at low speeds with certain types of motors (e.g., the series-wound traction motor) and although this involves overloading (i.e., overheating of the motor), this can be tolerated for short periods of time. Where electro-magnetic or regenerative breaking is used, similar high overloads occur during the breaking process. The overloading in accelerating and decelerating means low efficiency for the system, i.e., an excessive amount of electric power is lost as ohmic losses during acceleration and deceleration with the result that the vehicle range, on one battery charge, is greatly reduced.

Another factor in reducing the range is that the kinetic energy required to accelerate a vehicle is considerable and is additional to the energy needed to overcome vehicle losses such as those in the transmission, the tyres and the aerodynamic drag. In theory, the kinetic energy can be recouped by subsequently decelerating the vehicle by regenerative braking, i.e., using the motor as a generator to pump electrical energy back into the battery, but because batteries are not 100 percent reversible and because of the large ohmic losses in the motor and the generator under these conditions, the amount of the kinetic energy that is recouped in practice is rather small.

Experiments with standard electric vehicles have shown that the range when there are many starts and stops is only ½–¼ that obtained when the vehicle is travelling at constant design cruising speed. Furthermore, if the motor used is too small, an adequate acceleration performance is not obtained even with the maximum permissible overloading of the motor.

It has been previously proposed to provide an electric drive system including a flywheel coupled to an electric motor, the flywheel storing energy from the electric motor and providing the power for acceleration or hill-climbing when called for. One such system, for example, is described in Calvert U.S. Pat. No. 3,497,026. In this system the flywheel is coupled to the motor field, and the motor armature is coupled to a mechanical feed-back arrangement which provides a constant speed differential between the armature and field. Such a system, however, has a number of disadvantages. For one, it is quite complicated and clumsy because of the mechanical feed-back arrangement required. In addition, during rapid changes in the speed of the vehicle, there would be electrical overloading of the motor.

SUMMARY OF THE INVENTION

A broad object of the present invention is to provide an improved electric motor drive system for load devices of high inertia such as road vehicles or heavy machinery.

More particularly, an object of the present invention is to provide a drive system particularly for a road vehicle which allows the use of a relatively small electric motor, and yet provides high rates of acceleration and deceleration with no overloading of the motor thereby keeping the ohmic losses small and ensuring a range in start-stop driving substantially the same as at constant speed. Kinetic energy used for acceleration is recouped without loss during deceleration.

According to a broad aspect of the present invention, there is provided a variable-speed electric drive system for load devices of high inertia, comprising: an electric motor drive including a stator, a rotor, and an output shaft directly coupled to said motor through a fixed-ratio transmission; a flywheel directly coupled to said output shaft; and a bi-directional variable torque converter coupling said flywheel to the load device for varying the ratio of the output speed and torque to the load device with respect to the input speed and torque from the flywheel, the rated no-load speed of said motor drive being substantially equal to the maximum design speed of the flywheel, and the rated full-load speed of the motor drive being less than about 70 percent of the rated no-load speed of the motor drive.

The rated full-load speed of the motor drive is preferably 40–70 percent, more particularly about 50 percent, of the rated no-load speed.

The fixed-ratio transmission coupling the motor rotor to the flywheel could simply be the output shaft of the motor itself, in which case this ratio would be 1:1. The electric motor drive could also include speed increasing or speed-reducing gearing, whereupon the motor drive output shaft will be rotated in accordance with a fixed ratio with respect to the speed of the motor rotor. The important thing is that the motor drive output shaft is always coupled to the flywheel and therefore will rotate at the same speed as the flywheel.

The purpose of the foregoing arrangement is to match the self-regulation of the electric motor with the speed regulation of the flywheel.

The self-regulation of a motor ($R_M$) is defined herein as:

$$R_M = (\text{no-load speed}) - (\text{full-load speed})/(\text{no-load speed})$$

and the speed regulation of the flywheel ($R_F$) is defined as:

$R_F$ = (max. design speed) − (min. design speed)/(max. design speed)

Thus we arrange that $R_M \approx R_F$.

As will be described more fully below, a number of important advantages are produced by such an arrangement.

For reasons also more fully described below, the drive system would normally also include a clutch to disconnect same from the load device.

The invention further provides a vehicle including a traction wheel having the above-described drive system.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENT

Figure 1:
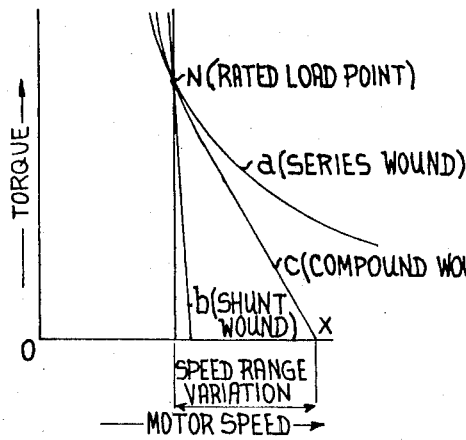
FIG. 1 is a diagram illustrating speed-torque characteristics of standard types of DC electric motors.

The energy E stored in a flywheel and delivered when it is slowed down is $E = \frac{1}{2} m (v_1^2 - v_2^2)$ where $v_1$ is the initial and $v_2$ the final speed of the rim and m is the mass of the rim. The maximum rim speed of a flywheel is governed by the tensile strength of the material as well as the design of the flywheel: for example, for steel a maximum speed $v_1$ is about 120m/sec.

It will be noted that $\frac{1}{2} m v_1^2$ is the total energy stored between maximum speed $v_1$ and zero speed. For slowing down from $v_1$ to $v_2$ the energy stored is $$\frac{1}{2} m v_1^2 [1-(v_2/v_1)^2] = \frac{1}{2} m v_1^2 F \text{ where}$$

$F = 1 - (v_2/v_1)^2$ = the fraction of the maximum possible energy.

It will be further noted that if $v_2 < \frac{1}{2} v_1$ then $F > 0.75$. In other words, slowing the flywheel down to about half its maximum speed yields 75 percent of the stored energy and that the benefit of slowing it down still further is rather small.

In the present invention, it is preferred to slow the flywheel down so that its minimum design speed is less than about 70 percent of its maximum design speed, the preferred range being about 40 percent to 70 percent of the maximum design speed. At the lower end (40 percent) of this range, it will be seen that about 84 percent of the stored energy is available for use, and at the upper end (70 percent) of this range, about 51 percent of the stored energy is available for use. The preferred minimum design speed of the flywheel is about 50 percent of the maximum design speed, whereupon 75 percent of the stored energy is available for use.

In accelerating a vehicle of mass M from rest to speed V, the kinetic energy developed is $\frac{1}{2} MV^2$. If this energy is obtained from a flywheel we have:

$$\frac{1}{2} m v_1^2 F = \frac{1}{2} MV^2$$

$$\text{or } m/M = V^2/Fv_1^2$$

If we consider the vehicle design speed V as, say 22.2 m/sec. (80kph) and F as about 0.75 and $v_1 \sim 120$ m/sec. we have $$m/M = .046$$

That is, if the mass of the flywheel is about 5 percent the mass of the vehicle, the flywheel stores enough energy to accelerate the vehicle from rest to its design speed of 80 kph. In practice, the flywheel may be a little heavier, for reasons explained later. Preferably the mass of the flywheel is about 5 - 10 percent of the total mass of the vehicle.

FIG. 1 illustrates the speed-torque characteristics of a DC motor involving an armature and a field. Curve a illustrates the variable speed relationship when the field is energised by a coil in series with the armature; and curve b illustrates the constant speed relationship of a shunt-wound motor. By having the field split with two coils--or sets of coils--one coil being series energised and one parallel (shunt) energised, the intermediate characteristic shown in curve c is obtained. Such a motor is sometimes referred to as "compound wound". All three curves have been chosen to have a common point N which represents the speed for the "design" or full load. The point X on curve c represents the no-load or maximum speed of this compound motor.

Figure 2:
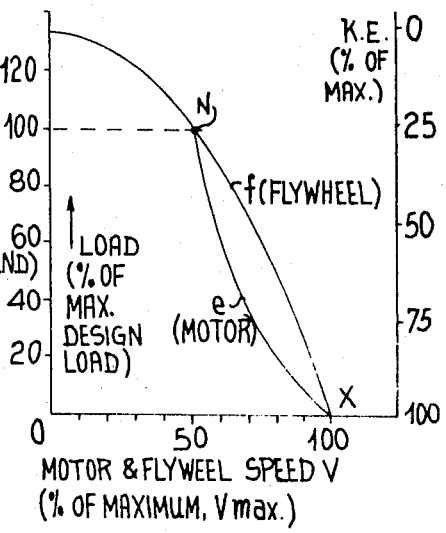
FIG. 2 is a diagram illustrating the matching of the self-regulation of the motor to the speed regulation of the flywheel in accordance with the present invention.

According to the present invention, the self-regulation of the motor is matched to the speed regulation of the flywheel. This is shown in the diagram of FIG. 2, wherein it will be seen that curve e (which represents the speed-torque characteristics of the compound-wound electric motor) and curve f (which represents the speed-kinetic-energy characteristics of the flywheel) both intersect at point N (the full-load point on the Motor curve e and the minimum velocity point of the flywheel curve f) and at point X (the no-load point on motor curve e and the maximum velocity point on flywheel curve f). When using a compound wound motor, it is quite easy to adjust the distribution of the series and shunt field currents so that the ratio of the no-load speed to the full-load speed is the same as the maximum and minimum design speeds, respectively, of the flywheel. While the compound-wound motor is well suited for this application because of these characteristics, other electric motors may be used, as will be described more fully below.

The flywheel is coupled directly (through the motor shaft or through a fixed-ratio gear transmission) to the motor rotor, which is preferably the armature but could also be the field. The stator of the motor is fixed to the support.

Figure 3:
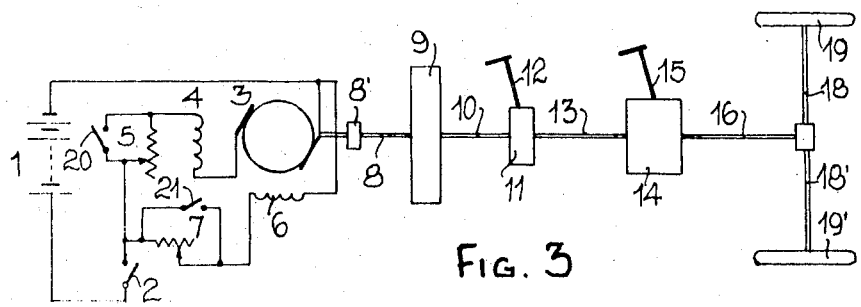
FIG. 3 is a block diagram of an adjustable-speed electric drive system for motor vehicles constructed in accordance with the invention.

FIG. 3 illustrates in block diagram an adjustable-speed electric drive system for an automobile constructed in accordance with the invention.

The system includes a battery 1 and a main switch 2 controlling the starting and stopping of a DC compoundwound electric motor having an armature 3, a series field winding 4 controlled by a starter resistor 5, and a shunt field winding 6 controlled by a shunt resistor 7. The field of the motor is the stator and is fixed to the automobile body. The armature is the rotor and its motor shaft 8 is directly coupled through a fixed-ratio transmission 8' (which may be merely the shaft itself) to a flywheel 9. The flywheel shaft 10 is connected to a clutch 11 controlled by a clutch pedal 12. The driven clutch element is coupled through shaft 13 to a torque converter 14 whose torque (or "gear") ratio is controlled by a pedal 15, the latter serving as the vehicle "accelerator." The torque converter is of the bi-directional type; i.e., it will transmit torque both from input to output and output to input. Most variable speed drives based upon friction or hydraulic pumps and motors are bi-directional, though some hydrokinetic types are not. The output shaft 16 of the torque converter is coupled through a differential 17 and drive axles 18, 18' to the vehicle drive wheels 19, 19'.

As indicated earlier, the design minimum speed of flywheel 9 is preferably 40 percent – 70 percent of the design maximum speed. In the preferred design described below, this is about 50 percent which will produce a speed regulation of the flywheel of 0.50, whereupon 75% of the stored energy of the flywheel is available for driving the vehicle wheels.

In accordance with the invention, the series field winding 4 and the shunt field winding 6 of electric motor 3 are designed so as to provide a selfregulation of the motor substantially matching the speed regulation of the flywheel. That is to say, the rated full-load speed of the motor drive is between 40 – 70 percent, preferably about 50 percent, of the rated no-load speed of the motor drive. Thus, when the flywheel is rotating at its maximum speed, the motor is also rotating at its maximum speed and is substantially unloaded, whereas when the flywheel is rotating at its minimum speed, the motor is also rotating at its minimum speed and is under its full-loaded condition accelerating the flywheel.

The system illustrated in FIG. 3 also includes a centrifugal switch 20 which cuts out series field resistor 5 after starting, when the motor speed approaches the design minimum speed. The system of FIG. 3 further includes another switch 21 which cuts out resistor 7 in series with the shunt field coil 6 of the electric motor. Switch 21 may be closed whenever regenerative braking is required or desired, for example at the end of the journey when the vehicle is to be brought to a stop. The energy stored in the flywheel at this time may be used by regeneratively braking motor 3 to charge batteries 1.

One example of the application of the invention to a small vehicle is now described with reference to the drive system shown in FIG. 4 and the diagram of FIG. 5.

The vehicle, which weighs 1000 kg. (including electric motor, flywheel, batteries and passengers) is intended for a maximum speed of 80 kph and is designed to be accelerated to this speed by energy mainly taken from the flywheel. The vehicle has a traction resistance on level ground of approx. $(14+.003V^2)$ kg-force where V is the speed in kph so that the traction force at 80 kph is 33.2 kg-f, which means 7.2 KW of power at the wheels. Allowing for transmission losses, this calls for a motor providing about 8 KW of mechanical power.

Figure 4:
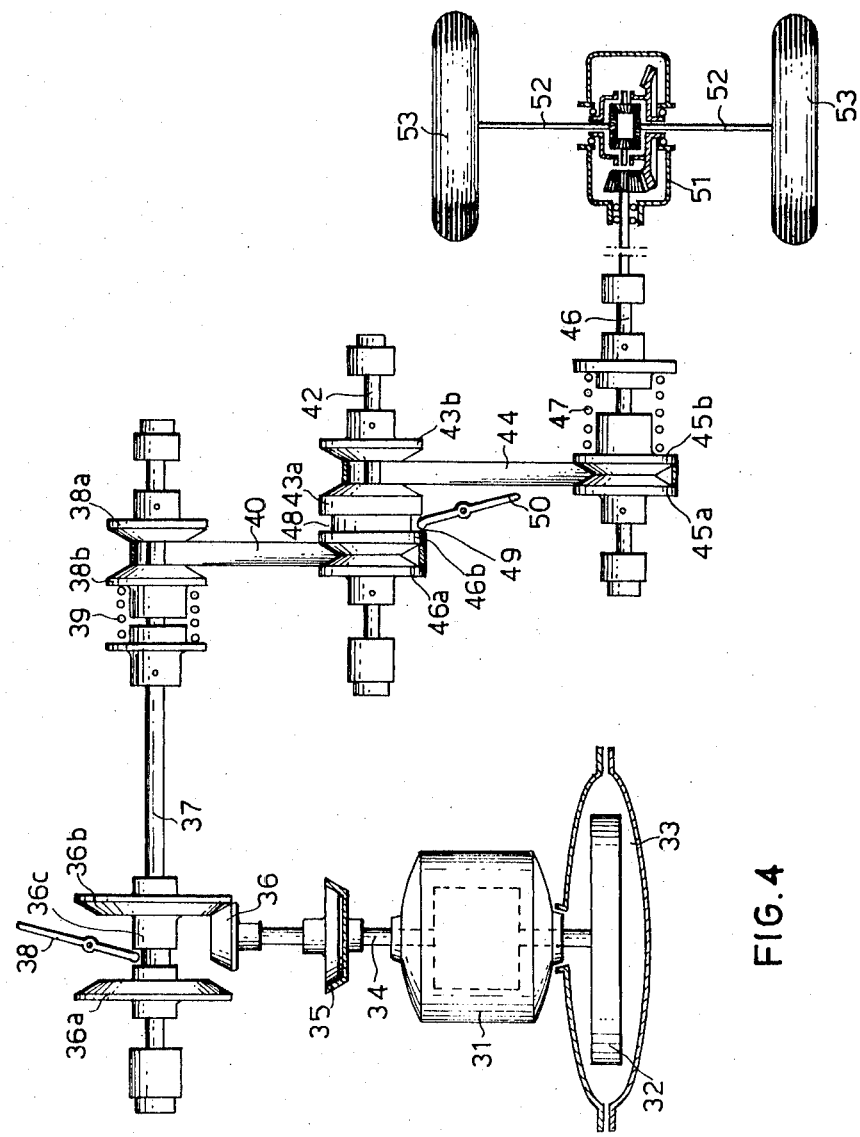
FIG. 4 illustrates one specific construction in accordance with the invention.

The drive system is shown in FIG. 4. The electric motor 31 is an 8 KW (mechanical output) compound motor with two fields, namely a shunt winding and a series winding. At the rated load (8KW), about half the field is provided by the shunt and half by the series fields. The motor speed on no load is 4800 RPM and at rated load is 2400 RPM. The torque-speed characteristic is as shown by curve e in FIG. 2. Motors with such characteristics and speeds can be provided by any competent manufacturer. On the shaft of the motor is mounted a disc flywheel 32 of 0.564 m diameter and mass of 75 kg with a moment of inertia of approximately 2.98 kg.m². At maximum speed of 4800 RPM this flywheel stores 38,200 kgf.m of kinetic energy and in slowing down to half speed (2400 RPM) it gives up three-fourths of this energy, i.e. 28,650 kgf.m, which is more than enough to accelerate the vehicle from rest to 80 kph. (Some energy is needed to overcome road resistance but because the electrical motor is also supplying some energy-increasing as the flywheel slows down-this makes up the deficit in the traction energy).

To avoid the gyroscope effect, the motor and flywheel are mounted with the axis of rotation vertically. To reduce air resistance loss, which at atmospheric pressure is of the order of 1 KW at the maximum speed, the flywheel is encased in an enclosure 33 and a partial vacuum drawn. As the air friction loss is approximately proportional to (pressure) 0.8 a high vacuum is not needed and a pressure of about 1/10 – 1/100 atmosphere, obtained by the aid of a small vacuum pump not shown, is adequate to reduce the air resistance losses to a few per cent of therated power of the motor.

The motor shaft 34 is connected by a clutch 35 to a right-angle bevel gear reducer 36 having, in this example, a reduction ratio of 3.33 to 1. The clutch disengages the rest of the drive from the motor so that the vehicle can remain stationary when the motor and flywheel may be spinning freely. The bevel gear has an extra gear element 36a which allows the direction of drive to be reversed without having to stop and reverse the motor and flywheel. This is effected by moving the two bevel wheels 36a, 36b, which are mounted on a single sleeve 36c on a splined shaft 37, to the right. The reversing lever 38 is connected to a corresponding lever in the driver's cabin.

Shaft 37 is connected to a torque converter, i.e., a variable "gear" of any conventional type. Preferably, it should permit a continuous variation in speed ratio of at least about 10 times between the lowest and highest ratios. For the present example a variation in speed ratio of about 16 times between lowest and highest ratios is needed. FIG. 4 illustrates a well-known conical pulley and a V-belt variable drive. As the total variation ratio of these drives is about 4:1, two units are used in series to obtain the 16:1 range needed. For this two stage unit, the output shaft 46 rotates at about ¼the speed of the input shaft 37 in "low gear" position and at about 4 times the speed of the input shaft in "high gear" position, with any intermediate ratio obtainable.

The variable drive includes two conical half-pulleys (total cone angle about 30°) with the outer diameter of about 30 cm being about twice the inner diameter. One of these half-pulleys 38a is fixed to shaft 37 and the other 38b is splined to the shaft but can slide along it and is pressed towards halfpulley 38a by a compression spring 39. Energy is transferred from half-pulleys 38a, and 38b by means of a V-belt 40 to two other half-pulleys 46a and 46b on an intermediary shaft 42. Half-pulley 46a is fixed to shaft 42 and half-pulley 46b is splined to the shaft but can slide along it. Half-pulley 46b also has a second side 43a which acts as half-pulley to the second stage of the variable speed drive system, its other half-pulley 43b being fixed to the shaft. Energy from half-pulleys 43a, 43b is transferred by means of a second V-belt 44 to two half-pulleys 45a and 45b mounted on the drive shaft 46. Half-pulley 45a is fixed to the shaft, while half-pulley 45b is splined to the shaft but can slide along it and is pressed towards 45a by a compression spring 47.

The wheel formed by half-pulleys 46b, 43a, has a central groove 48 which carries a roller 49 connected to a control lever 50 serving as the "accelerator" of the vehicle.

As shown in FIG. 4, the variable drive is in "low gear," i.e., the intermediate shaft 42 rotates at approximately one-half the speed of the input shaft 37 while the output drive shaft 46 rotates at approximately one-quarter the speed of the input. When pulley 46b, 43a is moved to the right by means of the accelerator lever 50, belt 40 "climbs" up the pulley 38a, 38b, halfpulley 38b moving in towards 38a under the action of the spring 39. Similarly belt 44 "climbs" down the pulley of 45a, 45b, the two halves being pushed apart by the belt against the resistance of spring 47. The extreme right-hand position of wheel 46b, 43a, defines the "high gear;" i.e., the intermediate shaft 42 rotates at approximately twice the speed of shaft 37 while the output drive shaft 46 rotates at approximately four times the speed of the input shaft 37.

The drive shaft 46 drives a differential 51 on the drive axle 52 of the vehicle which carries the vehicle drive wheels 53. The reduction ratio between drive shaft and axle is 4:1 for wheels (tyres) of approximately 59 cm. diam.

To operate the vehicle, the clutch 35 is disengaged (it was left disengaged from the last time the vehicle was brought to a stop) and the motor is switched on. It is allowed to gather speed until the motor and flywheel are idling at approximately maximum speed of 4800 RPM. The variable gear is in the "low gear" position, i.e., wheel 46b, 43b is at the extreme left-hand position. To start the vehicle, the clutch is released and energy is absorbed from the flywheel and used to accelerate the vehicle to approximately 10 kph. The flywheel speed is thereby reduced by about 2 percent. The motor and flywheel speed is now just below 4800 RPM, shaft 37 is rotating at just under 1440 RPM, the drive shaft 46 at one-quarter this speed, i.e., 360 RPM, and the drive axle 52 at 90 RPM, giving a speed of 10 kph for the vehicle.

As pulley 41b, 43a is moved across towards the right, the vehicle wheels try to rotate faster at the expense of the flywheel, and energy is transferred from the flywheel to the vehicle wheels, the flywheel slowing down in the process. As it slows down the motor picks up load until the maximum flywheel speed, i.e., the rated speed of the motor, 2400 RPM, is reached. If pulley 46b, 43a is moved quickly, the vehicle accelerates rapidly: if it is moved slowly, the acceleration is lower. A dashpot (not shown) may be incorporated to prevent the pulley being moved too rapidly as this would overload the belts (not the motor).

Figure 5:
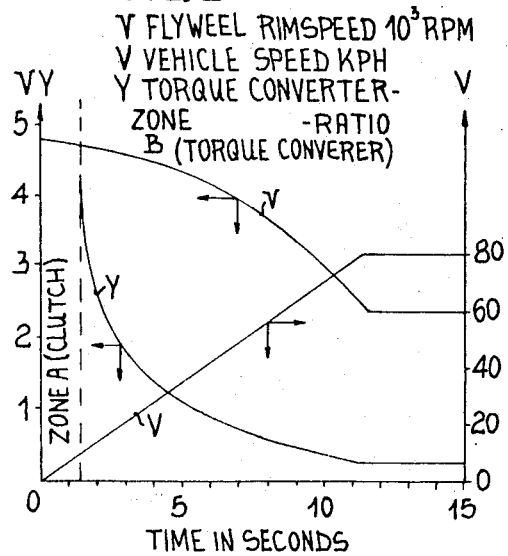
FIG. 5 is a diagram illustrating, in the system of FIG. 4, the variations in the flywheel rim speed when the torque converter ratio is adjusted to change the vehicle speed.

FIG. 5 shows the manner in which the torque converter ratio c/Y has to be altered by the operator, from approximately 4:1 to 4:4, in order to increase the vehicle speed V from 10 kph to 80kph with an acceleration of 0.2 g (7.05 kph per sec); FIG. 5 also shows how the flywheel speed V decreases in the process to nearly onehalf. The Zone A is controlled by the clutch; the Zone B by the variable gear. To slow down the vehicle, the pulley 46b, 43a is moved to the left, whereupon energy is absorbed from the vehicle and "pumped back" into the flywheel. It is interesting to note that, for this acceleration of 0.2 g, the power being delivered at 80 kph is over 50 KW although the motor is providing under 8 KW.

To prevent the motor being coupled via the clutch to a "high gear" position, the clutch control and accelerator control should be mechanically in series. That is, on pressing the accelerator, first the clutch is engaged---with the gear in "low" position--and then the gear ratio can be increased to accelerate the vehicle. Similarly, when slowing down, the accelerator is released which first reduces the gear ratio to minimum and then releases the clutch so that the vehicle when stationary has the clutch always disengaged. An electrical locking switch (not shown) may be provided to assure that the motor cannot be started if the accelerator pedal is depressed.

Thus, whatever the speed of the flywheel, so long as it is within its design maximum and minimum speed range, the motor is never overloaded as it always runs between its no-load condition and its rated-load condition. As the flywheel slows down between its maximum and minimum speeds, it imparts kinetic energy to the vehicle wheels, and the motor drives the flywheel increasing its speed and recharging it with energy. It will be seen, therefore, that the acceleration of the vehicle depends only upon the set ratio Y of the variable torque converter between the flywheel and the drive wheels, and not upon the power produced by the electric motor.

The motor is therefore not overloaded even upon rapid acceleration, which is an important advantage of the invention. The current drawn from the battery and passing through the motor thus never exceeds the maximum rated value for the motor and is often less. This results in a high effective capacity for the battery and allows the use of batteries with poor power density provided the energy density is adequate. Also, since high acceleration is possible without overloading, the limit being the torque drive and the grip of the tyres on the roads, the driver gets the feeling that he is driving a high-power vehicle with automatic transmission but prevented from exceeding a given speed limit.

The arrangement also provides nearly 100 percent efficiency for regeneration, i.e., when slowing down or descending gradients, since the energy is stored mechanically and not electro-chemically. Further, because motor currents are low when accelerating and decelerating, ohmic losses are small and the range of the vehicle per battery charge is not greatly affected by stops and starts. This compares with present elecric vehicles where the range is reduced to a half or even a quarter of the corresponding constant-speed range. Also the motor is smaller, the size being that just required to propel the vehicle at the top design speed, whereas in other electric vehicles, larger motors are needed to provide reasonable acceleration.

Further, because energy is withdrawn from the flywheel when accelerating, higher vehicle speeds correspond to lower motor speeds. This is another important advantage of the system since, in general, the power developed by an electric motor increases with decreasing speed, in contra-distinction to internal combustion engines where the power decreases with decreasing speed. In addition, the system described is quite simple and does not require a complicated mechanical feedback arrangement such as proposed in the system of U.S. Pat. No. 3,497,026.

The use of a shunt-wound DC motor is a preferred way of obtaining a large value of selfregulation, but is not the only way. For example, self-regulation of a DC shunt motor may be increased by inserting a resistance in the armature circuit, but this is very inefficient. The same applies with respect to inserting a resistance in the rotor circuit of an AC induction motor. A further technique for obtaining a large value of self-regulation in an electric motor is illustrated in FIG. 6.

Figure 6:
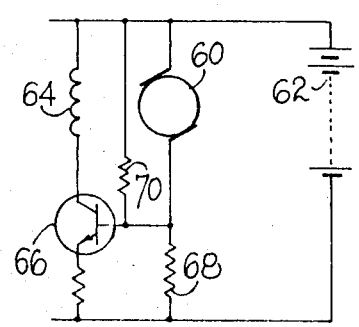
FIG. 6 is a diagram illustrating another form of electric motor that may be used in the novel drive system.

In FIG. 6, a DC electric motor 60 is driven by a battery 62, the motor including a shunt field coil 64. One side of coil 64 is connected to one side of the battery 62, and the other side of coil 64 is connected to the collector of a transistor 66. A pair of resistors 68, 70 are connected in series across the battery 62, and the junction of the two resistors is connected to the base of transistor 66. The emmiter of transistor 66 is connected to the other side of battery 62.

It will thus be seen that the current flowing through field coil 64 will depend upon the conductivity of transistor 66, and the latter will depend upon the bias applied to the base of the transistor. Under noload condition, this bias will be determined mainly by the ratio of resistor 70 to resistor 68, since there is insignificant armature current through the motor. Under load-conditions, however, there will be significant armature current, which is applied through resistor 68, and therefore the bias on the base of transistor 66 will vary in accordance with the amount of armature current to vary the current through the field coil 64.

This arrangement thus provides two components of field current, one component (determined by resistor 70) which is substantially constant, and another component (determined by resistor 68) which varies with armature current. Thus, the system of FIG. 6 would have characteristics similar to a compound-wound DC motor, and therefore could be used to provide the self-regulation characteristics required in the present invention.

It is sometimes convenient to make the flywheel somewhat heavier than that indicated in the above description in order to provide a reserve of energy for climbing long inclines, and a reserve of energy-absorbing-capacity for long declines.

Other torque converters may be used, for example hydrostatic (hydraulic pump plus motor) types.

It is sometimes convenient, especially for vehicle applications, to insert a clutch between the motor and the flywheel. If the vehicle is stationary and the flywheel is idling, there are, in addition to the windage losses of the flywheel (which can be kept small by a vacuum envelope), friction and windage losses of the motor. In this case the clutch may be opened (for example by a centrifugal control on the flywheel) and the motor will slow down quite rapidly and come to rest whereas the flywheel will slow down very slowly.

When the flywheel falls below a pre-set minimum speed, the clutch is re-activated and the motor picks up speed and adds energy to the flywheel. This is not an essential feature of the invention but it improves overall economy of electricity for those cases where the vehicle may be stationary for prolonged periods but nevertheless always ready to move off with high acceleration since the flywheel is always nearly fully charged.

Many other variations, modifications, and applications of the illustrated embodiment will be apparent.

What is claimed is:

1. A variable-speed electric drive system for load devices of high inertia, comprising: an electric motor drive including a stator, a rotor, and an output shaft directly coupled to said rotor through a fixed-ratio transmission; a flywheel directly coupled to said output shaft; a bi-directional variable torque converter coupling said flywheel to the load device for varying the ratio of the output speed and torque to the load device with respect to the input speed and torque from the flywheel, the electric motor drive being of variable-speed and having a self-regulation which is substantially matched to the speed regulation of the flywheel, the rated no-load speed of said motor drive being substantially equal to the maximum design speed of the flywheel, and the rated full-load speed of the motor drive being less than about 70 percent of the rated no-load speed of the motor drive; and means for continuously varying said ratio of the torque converter for controlling the acceleration of the drive system, the acceleration of the drive system thereby depending only on the ratio of the torque converter and not on the power produced by the electric motor drive, whereby a wide variation of speed is permitted without overloading the electric motor.

2. A drive system according to claim 1, wherein the rated full-load speed of the motor drive is 40 – 70 percent of the rated no-load speed of the motor drive.

3. A drive system according to claim 1, wherein the rated full-load speed of the motor drive is about 50 percent of the rated no-load speed of the motor drive.

4. A variable-speed electric drive system for load devices of high inertia, comprising, an electric motor drive, a flywheel continuously coupled to said electric motor drive, and a bi-directional variable torque converter coupled between said flywheel and the load device for varying the ratio of the output speed and torque to the load device with respect ot the input speed and torque from the flywheel, the electric motor drive being of variable-speed and having a self-regulation which is substantially matched to the speed regulation of the flywheel; and means for continuously varying said ratio of the torque converter for controlling the acceleration of the drive system, the acceleration of the drive system thereby depending only on the ratio of the torque converter and not on the power produced by the electric motor drive, whereby a wide variation of speed is permitted without overloading the electric motor.

5. A system according to claim 1, further including a clutch for disconnecting the drive system from the load device.

6. A drive system according to claim 1, wherein said electric motor is a DC compound-field motor.

7. A drive system according to claim 1, wherein said electric motor is a DC motor having a field winding, and control means therefore providing a component of field current which is substantially constant, and a component of field current which varies with armature current.

8. A drive system according to claim 1, wherein said bi-directional variable torque converter provides a variation in speed ratio of at least 10 times between the lowest and highest ratios.

9. A drive system according to claim 1, further including a battery supplying power to the electric motor.

10. A vehicle including a traction wheel and a drive system therefore as defined in claim 9.

11. A vehicle according to claim 10, wherein the mass of the flywheel is about 5–10 percent of the total mass of the vehicle.

* * * * *